Dec. 23, 1952 F. G. NEGRI 2,622,930
ROLLER SKATE WHEEL
Filed Aug. 9, 1950
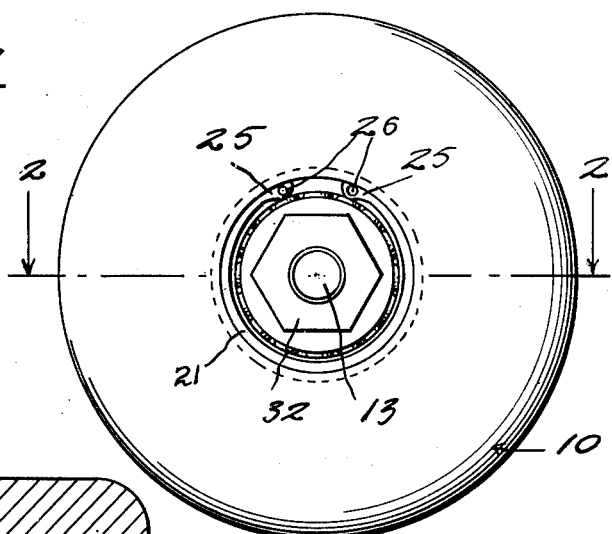
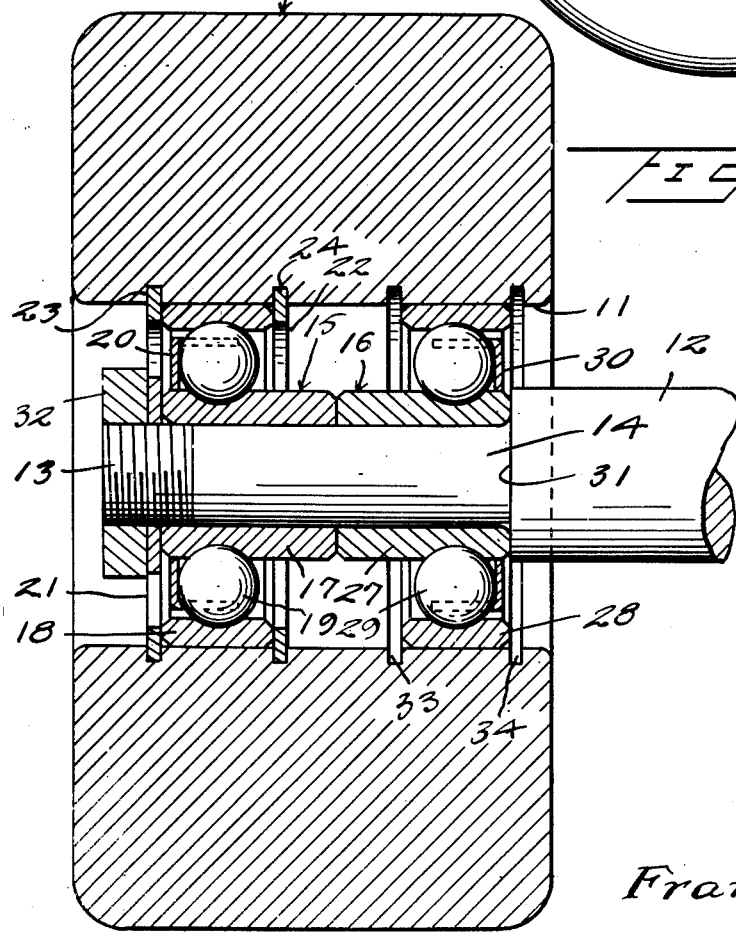
INVENTOR
*Frank G. Negri*
BY *Kimmel & Crowell*
ATTORNEYS Patented Dec. 23, 1952

2,622,930

UNITED STATES PATENT OFFICE 2,622,930

ROLLER SKATE WHEEL

Frank G. Negri, Jamaica, N. Y., assignor to Noel Precision Corporation, Jamaica, N. Y.

Application August 9, 1950, Serial No. 178,503

1 Claim. (Cl. 301—5.7)

This invention relates to roller skate wheels and to an improvement over the structure shown in my copending application Serial No. 172,991, filed July 10, 1950, for Roller Skate Wheel.

An object of this invention is to provide a roller skate wheel which may be formed out of wood, plastic or other material and which has a pair of anti-friction bearings mounted in the bore thereof with one bearing locked to the wheel body by means of a pair of split locking rings, and the other bearing disposed inwardly of the locked bearing and held in the bore between the locked bearing and a shoulder formed on the spindle or shaft.

Another object of this invention is to provide a roller skate wheel which may be formed out of wood, plastic or the like which has a pair of anti-friction bearings in a central bore formed in the wheel body which are so arranged that either the wheel or the bearings may be reversed.

With the above and other objects in view, my invention consists in the arrangement, combination and details of construction disclosed in the drawings and specification, and then more particularly pointed out in the appended claim.

In the drawings:

Figure 1 is a detail end elevation of a roller skate wheel constructed according to an embodiment of this invention.

Figure 2 is a sectional view taken on the line 2—2 of Figure 1.

Referring to the drawing, the numeral 10 designates generally a wheel body which is formed with a centrally disposed bore 11 therethrough. The body 10 may be formed of wood, plastic, or other suitable material, and the wheel body 10 is rotatably mounted on an axle 12 formed with a reduced stud 14 having threads 13 at its outer end.

A pair of anti-friction bearings generally designated as 15 and 16 are disposed about the stud 14 and positioned within the bore 11. The bearing 15 comprises an inner race 17 and an outer race 18 between which balls 19 are rotatably disposed. A retainer 20 is disposed between the two races and engages loosely about the balls 19. The inner race 17 is substantially longer than the outer race projecting from one end of the outer race as shown in Figure 2. The bearing 15 which is the outer bearing is removably locked within the bore 11 by means of a pair of split resilient locking rings 21 and 22.

The rings 21 and 22 bear against the opposite ends of the outer race 18 and engage in annular grooves 23 and 24, respectively which are formed in the bore 11. Each locking ring as shown in Figure 1 includes an enlargement 25 at the free end thereof which is formed with an opening 26 for receiving a ring contracting tool so that the locking ring may be contracted sufficiently to permit the ring to pass into the bore 11.

The inner anti-friction bearing 16 is formed identical with the outer bearing 15 and comprises an inner race 27 which is substantially longer than the outer race 28. Balls 29 are disposed between the two races 27 and 28 and are retained by means of a retainer 30. The inner race 27 is adapted to abut against the shoulder 31 formed at the inner end of the stud 14, and when a nut 32 is threaded on the threads 13, inner race 27 is tightly clamped against the shoulder 31 and inner race 17 tightly bears against the outer end of inner race 27.

The wheel body 10 may also be formed with a second pair of annular grooves 33 and 34 so that if desired the wheel 10 may be reversed with the inner end thereof disposed outermost and with the outer bearing 15 locked between the rings engaging in the annular grooves 33 and 34. If desired, a second pair of locking rings may be disposed in the grooves 33 and 34, although normally this will not be necessary as the inner bearing 16 is held against endwise movement by clamping engagement against the shoulder 31 and the clamping pressure exerted on bearing 16 by the inner race 17 of outer bearing 15.

In the use of this roller skate wheel structure, the inner race 16 is slipped over the stud 14, and the outer bearing 15 may be initially locked in the wheel 10 by means of the locking rings 21 and 22. The outer bearing 15 may then be slipped over the stud 14 until the inner race 17 abuts against the inner race 27 of inner bearing 16. The nut 32 may then be tightly engaged with outer bearing race 17 so as to tightly clamp the two race members 17 and 27 onto the stud 14 with inner race 27 abutting against shoulder 21.

In the event it is necessary to reverse the wheel member 10, this may be done by merely removing nut 32 and withdrawing bearing member 15 and wheel body 10 from the stud 14.

Inner bearing 16 may be disposed at the outer portion of stud 13 with the inner bearing 15 innermost, or if desired, the bearing 16 may be locked to wheel body 10 by means of locking rings 25. The wheel body 10 is preferably formed out of wood, although it may be formed out of plastic, fiber or other suitable material. The manner in which the bearings are locked to the wheel body provides a means whereby the metal liner which has heretofore been used may be eliminated.

I claim:

A roller skate wheel comprising a reversible wheel body having a central bore, said wheel body having pairs of spaced annular grooves in said bore, outer bearing races disposed between each pair of grooves and being of a width substantially equal to the distance between the grooves of each pair, an axle including a reduced diameter stud extending into said central bore of the wheel body, said stud forming a shoulder on said axle, inner bearing races surrounding said stud and being longer than said outer bearing races, ball bearings connecting the inner bearing races with the respective outer bearing races, the innermost inner bearing races engaging said axial shoulder and the outermost inner bearing race engaging the innermost inner bearing race, the distance between the groove of each pair adjacent the respective ends of said wheel body being substantially equal to the outer length of the inner bearing races so that upon the wheel body being reversed upon the axle the inner bearing races may still engage each other, resilient lock rings engageable on opposite sides of at least the outer race of the outermost outer bearing race to preclude the longitudinal displacement thereof in said central bore, and a locking nut on said stud, said locking nut and said shoulder precluding displacement of the inner bearing races from said stud and the wheel assembly from the axle.

FRANK G. NEGRI.

REFERENCES CITED

The following references are of record in the file of this patent:

UNITED STATES PATENTS

| Number | Name | Date |
|---|---|---|
| 876,836 | Blimpton | Jan. 14, 1908 |
| 1,978,186 | Buchanan | Oct. 23, 1934 |
| 2,022,348 | Hoerle | Nov. 26, 1935 |
| 2,141,122 | Boden | Dec. 20, 1938 |
| 2,405,122 | Firth | Aug. 6, 1946 |
| 2,440,650 | Batesole | Apr. 27, 1948 |
| 2,552,035 | Cooke | May 8, 1951 |